(12) United States Patent
Kim et al.

(10) Patent No.: US 12,115,839 B2
(45) Date of Patent: Oct. 15, 2024

(54) THERMAL MANAGEMENT SYSTEM FOR VEHICLE

(71) Applicants: HYUNDAI MOTOR COMPANY, Seoul (KR); KIA CORPORATION, Seoul (KR); HANON SYSTEMS, Daejeon (KR)

(72) Inventors: Yeonho Kim, Seoul (KR); Gee Young Shin, Suwon-si (KR); Jae Yeon Kim, Hwaseong-si (KR); Jeawan Kim, Gwangmyeong-si (KR); Jaechun Ryu, Daejeon (KR); Inguk Hwang, Daejeon (KR)

(73) Assignees: HYUNDAI MOTOR COMPANY, Seoul (KR); KIA CORPORATION, Seoul (KR); HANON SYSTEMS, Daejeon (KR)

( * ) Notice: Subject to any disclaimer, the term of this patent is extended or adjusted under 35 U.S.C. 154(b) by 0 days.

(21) Appl. No.: 17/514,886

(22) Filed: Oct. 29, 2021

(65) Prior Publication Data
US 2022/0314743 A1    Oct. 6, 2022

(30) Foreign Application Priority Data
Mar. 30, 2021  (KR) .......................... 10-2021-0040856

(51) Int. Cl.
*B60H 1/32*     (2006.01)
*B60H 1/00*     (2006.01)
(Continued)

(52) U.S. Cl.
CPC ....... *B60H 1/3228* (2019.05); *B60H 1/00271* (2013.01); *B60H 1/00392* (2013.01);
(Continued)

(58) Field of Classification Search
CPC .............. B60H 1/3228; B60H 1/00271; B60H 1/00392; B60H 1/00485; B60H 1/3227;
(Continued)

(56) References Cited

U.S. PATENT DOCUMENTS 5,291,960 A * 3/1994 Brandenburg ........ B60W 10/26
                                                    123/41.14
5,299,431 A * 4/1994 Iritani .................. B60H 1/3211
                                                    62/243

(Continued)

*Primary Examiner* — Ljiljana V. Ciric
(74) *Attorney, Agent, or Firm* — MCDONNELL BOEHNEN HULBERT & BERGHOFF LLP

(57) ABSTRACT

A thermal management system for a vehicle includes: a cooling apparatus including a radiator, a first water pump, and a first valve that are connected by a coolant line and recirculating a coolant in the coolant line so as to cool at least one electrical component provided on the coolant line, a first connection line selectively connected to the coolant line through the first valve, a second connection line selectively connected to the first connection line through the second valve, and a heater provided on the second connection line, wherein the first connection line is provided with a condenser included in an air conditioner device, and the heater is provided inside an HVAC module included in the air conditioner device.

19 Claims, 2 Drawing Sheets

(51) Int. Cl.
    *B60K 1/00*    (2006.01)
    *B60K 11/02*   (2006.01)
(52) U.S. Cl.
    CPC ....... *B60H 1/00485* (2013.01); *B60H 1/3227* (2013.01); *B60H 1/32284* (2019.05); *B60K 11/02* (2013.01); *B60H 2001/00307* (2013.01); *B60K 2001/006* (2013.01)
(58) Field of Classification Search
    CPC ...... B60H 2001/00307; B60H 1/32284; B60H 1/143; B60H 1/323; B60H 1/00521; B60H 1/00849; B60H 1/00885; B60H 1/3213; B60K 11/02; B60K 2001/006
    See application file for complete search history.

(56) References Cited

U.S. PATENT DOCUMENTS

| | | | | |
|---|---|---|---|---|
| 5,483,807 | A * | 1/1996 | Abersfelder | B60H 1/00492 62/243 |
| 6,347,528 | B1 * | 2/2002 | Iritani | B60H 1/3207 62/434 |
| 7,789,176 | B2 * | 9/2010 | Zhou | B60L 58/26 180/65.1 |
| 7,841,431 | B2 * | 11/2010 | Zhou | B60H 1/00278 180/65.1 |
| 7,975,757 | B2 * | 7/2011 | Nemesh | H01M 10/6568 165/42 |
| 8,402,776 | B2 * | 3/2013 | Johnston | B60L 50/40 62/79 |
| 8,448,696 | B2 * | 5/2013 | Johnston | B60L 58/27 165/917 |
| 8,899,062 | B2 * | 12/2014 | Kadle | B60H 1/00342 62/333 |
| 8,899,492 | B2 * | 12/2014 | Kelty | B60L 58/16 320/150 |
| 9,533,545 | B2 * | 1/2017 | Chang | B60H 1/00392 |
| 9,561,704 | B2 * | 2/2017 | Enomoto | B60K 11/02 |
| 9,707,822 | B2 * | 7/2017 | Cheng | B60K 11/085 |
| 9,731,576 | B2 * | 8/2017 | Johnston | B60H 1/00921 |
| 9,731,577 | B2 * | 8/2017 | Johnston | B60H 1/00921 |
| 9,731,578 | B2 * | 8/2017 | Johnston | H01M 10/663 |
| 9,758,010 | B2 * | 9/2017 | Johnston | B60H 1/00385 |
| 9,758,011 | B2 * | 9/2017 | Johnston | B60H 1/32284 |
| 9,758,012 | B2 * | 9/2017 | Johnston | B60H 1/00921 |
| 9,802,460 | B2 * | 10/2017 | Cheng | H01M 10/6569 |
| 9,908,382 | B2 * | 3/2018 | Cheng | B60L 1/02 |
| 10,099,531 | B2 * | 10/2018 | Labaste Mauhe | B60H 1/321 |
| 10,150,383 | B2 * | 12/2018 | Gauthier | B60L 3/0061 |
| 10,173,491 | B2 * | 1/2019 | Kim | B60H 1/00007 |
| 10,272,736 | B2 * | 4/2019 | Cheng | B60L 50/64 |
| 10,406,888 | B2 * | 9/2019 | Cheng | B60H 1/143 |
| 10,427,491 | B2 * | 10/2019 | Johnston | B60H 1/323 |
| 10,525,787 | B2 * | 1/2020 | Cheng | B60H 1/2218 |
| 10,634,402 | B2 * | 4/2020 | Kim | B60H 1/00385 |
| 10,677,500 | B2 * | 6/2020 | Kim | F25B 25/005 |
| 10,717,337 | B2 * | 7/2020 | Kim | B60L 58/24 |
| 10,814,692 | B2 * | 10/2020 | Kim | B60H 1/32284 |
| 10,889,157 | B2 * | 1/2021 | Kim | B60H 1/00278 |
| 10,967,702 | B2 * | 4/2021 | Mancini | B60H 1/00278 |
| 10,974,566 | B2 * | 4/2021 | Kim | B60H 1/00278 |
| 10,987,998 | B2 * | 4/2021 | Kim | B60H 1/00885 |
| 11,065,934 | B2 * | 7/2021 | Lee | B60H 1/00328 |
| 11,110,772 | B2 * | 9/2021 | Oh | B60H 1/32284 |
| 11,142,037 | B2 * | 10/2021 | Kim | B60H 1/143 |
| 11,155,138 | B2 * | 10/2021 | Kim | B60H 1/00007 |
| 11,186,137 | B2 * | 11/2021 | Kim | B60H 1/32284 |
| 11,254,188 | B2 * | 2/2022 | Ishizeki | B60K 11/04 |
| 11,305,607 | B2 * | 4/2022 | Kim | B60H 1/00392 |
| 11,318,816 | B2 * | 5/2022 | Kim | B60H 1/32281 |
| 11,325,444 | B2 * | 5/2022 | Kim | B60H 1/00899 |
| 11,325,445 | B2 * | 5/2022 | Kim | B60H 1/00007 |
| 11,351,838 | B2 * | 6/2022 | Kim | B60H 1/00485 |
| 11,358,435 | B2 * | 6/2022 | Kim | B60H 1/00885 |
| 11,376,921 | B2 * | 7/2022 | Kim | B60H 1/32284 |
| 11,390,141 | B2 * | 7/2022 | Kim | B60H 1/00921 |
| 11,407,273 | B2 * | 8/2022 | Kim | B60H 1/00321 |
| 11,413,929 | B2 * | 8/2022 | Kim | B60H 1/00485 |
| 11,427,050 | B2 * | 8/2022 | Kim | B60H 1/00278 |
| 11,458,798 | B2 * | 10/2022 | Lee | B60H 1/00921 |
| 11,458,811 | B2 * | 10/2022 | Kim | B60H 1/00007 |
| 11,458,812 | B2 * | 10/2022 | Jeong | B60H 1/00907 |
| 11,479,076 | B2 * | 10/2022 | Kim | B60H 1/00485 |
| 11,479,077 | B2 * | 10/2022 | Kim | B60H 1/32284 |
| 11,505,038 | B2 * | 11/2022 | Kim | B60H 1/00899 |
| 11,529,844 | B2 * | 12/2022 | Kim | B60H 1/00885 |
| 11,613,163 | B2 * | 3/2023 | Kim | B60H 1/00278 62/196.1 |
| 11,613,164 | B2 * | 3/2023 | Kim | B60H 1/00278 62/185 |
| 11,654,744 | B2 * | 5/2023 | Kim | B60H 1/00821 62/159 |
| 11,794,550 | B2 * | 10/2023 | Kim | B60H 1/143 |
| 11,807,066 | B2 * | 11/2023 | Hwang | B60H 1/00885 |
| 2009/0020620 | A1 * | 1/2009 | Douarre | B60H 1/039 237/12.3 R |
| 2010/0012295 | A1 * | 1/2010 | Nemesh | H01M 10/6568 165/104.19 |
| 2012/0304674 | A1 * | 12/2012 | Schwarzkopf | B60H 1/00878 62/238.1 |
| 2013/0118707 | A1 * | 5/2013 | Kardos | H01M 10/615 165/42 |
| 2013/0319029 | A1 * | 12/2013 | Sekiya | F25B 25/005 62/238.7 |
| 2014/0190189 | A1 * | 7/2014 | Kowsky | B60H 1/00899 62/81 |
| 2015/0217623 | A1 * | 8/2015 | Hatakeyama | B60L 1/02 429/62 |
| 2015/0273976 | A1 * | 10/2015 | Enomoto | B60L 3/0046 62/243 |
| 2016/0107501 | A1 * | 4/2016 | Johnston | B60H 1/00278 165/41 |
| 2016/0107503 | A1 * | 4/2016 | Johnston | B60H 1/00278 165/202 |
| 2016/0107508 | A1 * | 4/2016 | Johnston | B60H 1/00278 237/12.3 A |
| 2016/0229282 | A1 * | 8/2016 | Hettrich | B60L 58/24 |
| 2017/0361677 | A1 * | 12/2017 | Kim | H01M 10/663 |
| 2019/0145675 | A1 * | 5/2019 | Kim | B60H 1/00342 62/324.6 |
| 2021/0039474 | A1 * | 2/2021 | Kim | B60H 1/00278 |
| 2021/0245571 | A1 * | 8/2021 | Hwang | B60H 1/32284 |
| 2021/0370747 | A1 * | 12/2021 | Lee | B60H 1/00278 |
| 2021/0384572 | A1 * | 12/2021 | Lee | B60H 1/00278 |
| 2022/0052390 | A1 * | 2/2022 | Kim | H01M 10/6564 |
| 2022/0097487 | A1 * | 3/2022 | Jin | B60K 11/04 |
| 2022/0111698 | A1 * | 4/2022 | Kim | B60H 1/00007 |
| 2022/0314743 | A1 * | 10/2022 | Kim | B60H 1/00271 |
| 2022/0349627 | A1 * | 11/2022 | Lee | B60H 1/00278 |
| 2022/0355650 | A1 * | 11/2022 | Kim | B60H 1/00328 |
| 2022/0379681 | A1 * | 12/2022 | Kim | B60H 1/00485 |
| 2023/0173872 | A1 * | 6/2023 | Jeong | B60H 1/00278 62/185 |
| 2023/0173881 | A1 * | 6/2023 | Jeong | B60H 1/00278 62/247 |
| 2023/0173882 | A1 * | 6/2023 | Cho | B60H 1/32284 62/196.4 |
| 2023/0173883 | A1 * | 6/2023 | Jeong | B60H 1/00278 62/159 |
| 2023/0173884 | A1 * | 6/2023 | Jeong | B60H 1/32284 165/160 |
| 2023/0173887 | A1 * | 6/2023 | Jeong | B60H 1/143 62/238.6 |
| 2024/0034129 | A1 * | 2/2024 | Kim | B60H 1/00278 |

\* cited by examiner

THERMAL MANAGEMENT SYSTEM FOR VEHICLE

CROSS-REFERENCE TO RELATED APPLICATION

This application claims priority to and the benefit of Korean Patent Application No. 10-2021-0040856 filed in the Korean Intellectual Property Office on Mar. 30, 2021, the entire contents of which are incorporated herein by reference.

BACKGROUND

(a) Field

The present disclosure relates to a thermal management system for a vehicle. More particularly, the present disclosure relates to a thermal management system for a vehicle, which improves heating efficiency by using waste heat generated from electrical components, and performs indoor cooling of the vehicle by using a refrigerant or coolant.

(b) Description of the Related Art

As environmental issues and energy resource issues become increasingly important, electric vehicles are in the spotlight as a means of transportation for the future. Since the electric vehicle uses a battery module in which a plurality of rechargeable batteries (cells) capable of charging or discharging is formed into a single pack as a primary power source, there is no exhaust gas and the noise is very little.

This electric vehicle is driven by a drive motor that operates through power supplied from the battery module. In addition, the electric vehicle is provided with electrical components for controlling and managing the drive motor and charging the battery module along with a plurality of electronic convenience devices.

However, the battery module and electrical components along with the drive motor used as the primary power source of the electric vehicle produce a very large amount of heat, so efficient cooling is required, and efficient temperature management of the electrical components and battery module may be a very important issue.

Conventionally, a separate cooling system is applied to control the temperature of the electrical component and the battery module, but the capacity has to be increased according to the size of the electrical component and the battery module, so there is a problem in that space is limited. In addition, when the capacity of each cooling system is increased, there is also a problem in that the power required to operate the cooling system is increased.

Accordingly, in the electric vehicle, in order to maximize energy efficiency while securing durability of the electrical component and battery module, technology development for efficiently using the waste heat generated from the electrical component along with the temperature control of the electrical component and the battery is desired.

The above information disclosed in this Background section is only for enhancement of understanding of the background of the disclosure, and therefore it may contain information that does not form the prior art that is already known in this country to a person of ordinary skill in the art.

SUMMARY

The present disclosure is addresses the problem as described above, providing a thermal management system for a vehicle for promoting simplification of an entire system by heating the interior of the vehicle using waste heat generated from electrical components and cooling the interior of the vehicle using the refrigerant or coolant.

A thermal management system for a vehicle according to an embodiment of the present disclosure includes: a cooling apparatus including a radiator, a first water pump, and a first valve that are connected by a coolant line and recirculating a coolant in the coolant line so as to cool at least one electrical component provided on the coolant line, a first connection line selectively connected to the coolant line through the first valve, a second connection line selectively connected to the first connection line through the second valve; and a heater provided on the second connection line, wherein the first connection line is provided with a condenser included in an air conditioner device, and the heater is provided inside an HVAC module included in the air conditioner device.

The air conditioner device may include: the HVAC module that selectively inflows outside air into the interior of the vehicle according to a cooling mode, heating mode, and dehumidification mode of the vehicle, the condenser connected to the first connection line to recirculate the coolant inside and heat-exchanging the refrigerant supplied through the refrigerant line with the coolant, an evaporator connected to the condenser through the refrigerant line and evaporating the refrigerant, a compressor connected between the evaporator and the condenser through the refrigerant line; and an expansion valve provided on the refrigerant line between the condenser and the evaporator.

The evaporator may be disposed in front of the heater inside the HVAC module based on a direction in which the outside air inflows to the interior of the vehicle so that outside air inflowing to the HVAC module passes first.

A sub-condenser may be further provided on the refrigerant line between the condenser and the evaporator.

The condenser may be a water-cooled heat-exchanger, and the sub-condenser and the evaporator may be an air-cooled heat-exchanger.

Inside the HVAC module, a cooler that selectively inflows low-temperature coolant may be provided.

The cooler may be disposed in front of the heater inside the HVAC module based on the direction in which the outside air is inflowed to the vehicle's interior so that the outside air inflowed to the HVAC module passes first.

The cooler may be provided on the third connection line that is selectively connected to the coolant line through the operation of the third valve provided on the coolant line between the radiator and the electrical component.

The evaporator may be connected to the third connection line so that the coolant recirculates inside and evaporates the refrigerant supplied through the refrigerant line through heat-exchange with the coolant.

A sub-condenser may be further provided on the refrigerant line between the condenser and the evaporator, the condenser and the evaporator may be a water-cooled heat-exchanger, and the sub-condenser may be an air-cooled heat-exchanger.

The coolant, of which temperature is lowered through heat-exchange with the refrigerant while passing through the evaporator, may be supplied through the third connection line to the cooler in the cooling mode of the vehicle.

The third water pump may be provided on the third connection line between the third valve and the evaporator.

The third valve may connect the coolant line and the third connection line so that the coolant cooled while passing the evaporator is supplied to the cooler in the cooling mode of the vehicle.

The third valve may be a 4-way valve.

The first valve may connect the coolant line and the first connection line so that the coolant is supplied to the condenser in a cooling mode and a dehumidification mode of the vehicle.

The second valve may connect the second connection line to the first connection line to supply the coolant of a high temperature passing through the electrical component to the heater in the heating mode of the vehicle.

A reservoir tank may be provided on the coolant line between the radiator and the first valve.

A second water pump may be provided on the first connection line between the first valve and the condenser.

The first and second valves may be 4-way valves.

The electrical component may include a motor, an electric power control unit, an inverter, an on-board charger (OBC), a power converter, or an autonomous driving controller.

As described above, according to the thermal management system for the vehicle according to an embodiment of the present disclosure, by heating the vehicle indoor using the waste heat generated from the electrical components and performing the indoor cooling of the vehicle using the refrigerant or coolant, simplification and ease of the entire system may be achieved.

In addition, the present disclosure may improve heating efficiency by recovering the waste heat generated from the electrical components to be used for the indoor heating.

In addition, the present disclosure may realize a compact HVAC module through the reduction of a number of parts of the HVAC module, by omitting the opening/closing door provided inside the conventional HVAC module, thereby reducing the amount of manufacturing labor and improving productivity.

In addition, the present disclosure may secure sufficient indoor space of the vehicle by moving the HVAC modules, which were conventionally provided in the interior of the vehicle, from the car room to the vehicle body through the removal of the opening/closing door.

Furthermore, through simplification of the entire system, it is possible to reduce a manufacturing cost and weight, and to improve space utilization.

DETAILED DESCRIPTION

Figure 1:
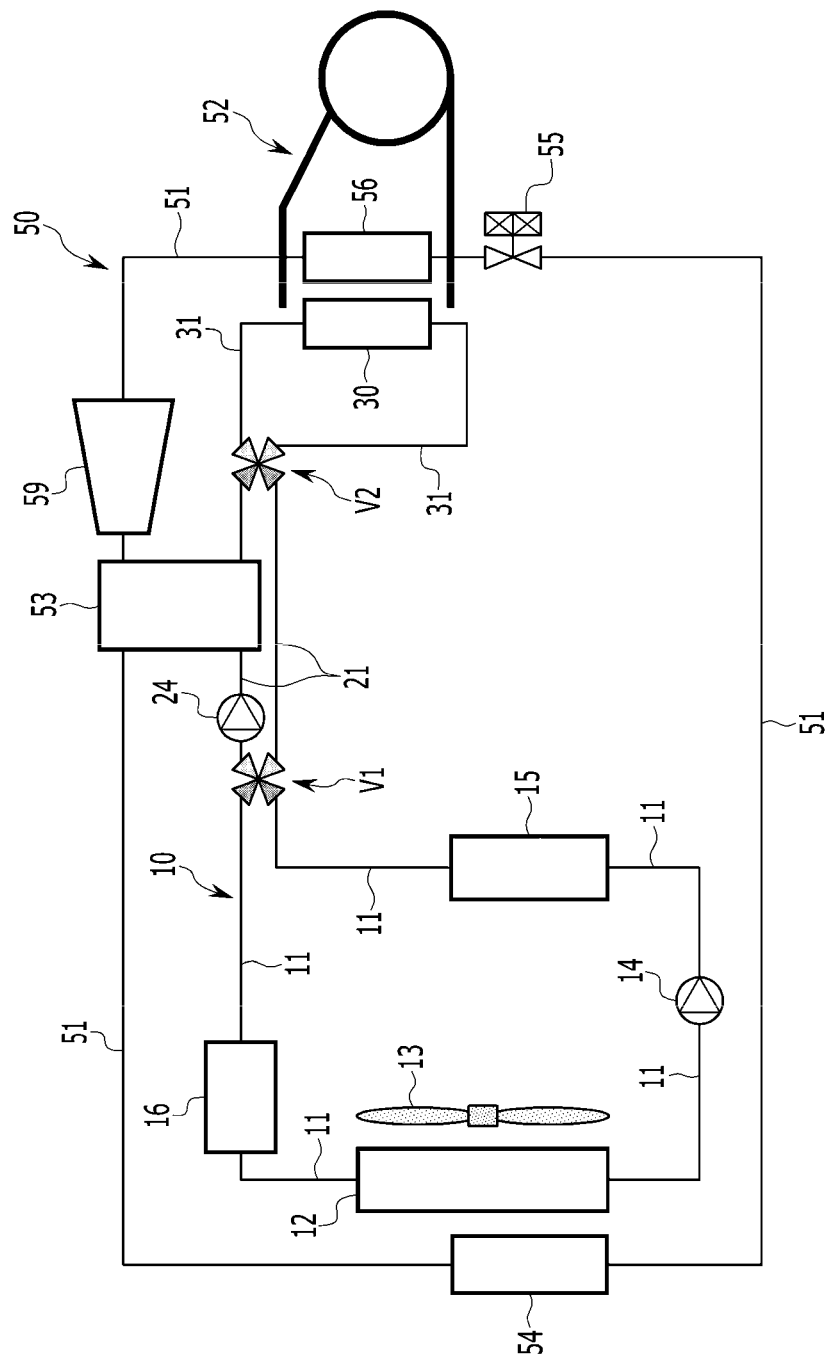
FIG. 1 is a block diagram of a thermal management system for a vehicle according to an embodiment of the present disclosure.

An embodiment of the present disclosure will hereinafter be described in detail with reference to the accompanying drawings.

Embodiments described in the present specification and a configuration shown in the drawings are merely certain embodiments of the present disclosure, and do not limit the spirit and scope of the present disclosure. Therefore, it should be understood that there may be various equivalents and modifications capable of replacing them at the time of filing of the present application.

In order to clarify the present disclosure, parts that are not connected with the description will be omitted, and the same elements or equivalents are referred to as the same reference numerals throughout the specification.

The size and thickness of each element are arbitrarily shown in the drawings, and the present disclosure is not necessarily limited thereto, and in the drawings, the thickness of layers, films, panels, regions, etc., are exaggerated for clarity.

Throughout this specification and the claims which follow, unless explicitly described to the contrary, the word "comprise" or variations such as "comprises" or "comprising" will be understood to imply the inclusion of stated elements but not the exclusion of any other elements.

Further, the terms, " . . . unit", " . . . mechanism", " . . . portion", " . . . member" etc. used herein mean the unit of inclusive components performing at least one or more functions or operations.

Recently, an electric vehicle composed of a vehicle body for driving and a car room that is selectively coupled to the vehicle body and has an interior space for various purposes is being developed.

In the electric vehicle configured as described above, research and development for moving the constituent element provided in the car room to the vehicle body is essential in order to secure a sufficient interior space of the car room.

FIG. 1 is a block diagram of a thermal management system for a vehicle according to an embodiment of the present disclosure.

The thermal management system for the vehicle according to an embodiment of the present disclosure may recover the waste heat generated from an electrical component 15 to be used for indoor heating and perform indoor cooling by using a coolant or refrigerant.

This thermal management system may be applied to an electric vehicle.

Referring to FIG. 1, the thermal management system may include a cooling apparatus 10, a first connection line 21, a heater 30, a second connection line 31, and an air conditioner device 50.

First, the cooling apparatus 10 includes a radiator 12, a first water pump 14, a first valve V1, and a reservoir tank 16 that are connected by a coolant line 11.

The radiator 12 is disposed at the front of the vehicle, and a cooling fan 13 is provided at the rear, and the coolant is cooled through the operation of the cooling fan 13 and heat-exchange with outside air.

In addition, the electrical component 15 may include an electric power control unit (EPCU), a motor, an inverter, a power conversion device such as an on-board charger (OBC), or an autonomous driving controller.

The electric power control unit or the inverter may heat up while driving, and the on-board charger may heat up when charging the battery.

The electrical component 15 configured in this way is provided in the coolant line 11 and may be cooled as a water-cooling type.

Accordingly, when the waste heat of the electrical component 15 is recovered in the heating mode of the vehicle, heat generated from the electric power control unit, the motor, the inverter, or the on-board charger may be recovered.

Meanwhile, the reservoir tank 16 is provided on the coolant line 11 between the radiator 12 and the first valve V1.

This cooling apparatus 10 may circulate the coolant in the coolant line 11 through the operation of the first water pump 14 so that the coolant is supplied to the electrical component 15 provided in the coolant line 11.

The first connection line 21 is selectively connected to the coolant line 11 through the first valve V1.

Here, the first connection line 21 may be provided with the condenser 53 provided in the air conditioner device 50.

In addition, the first connection line 21 between the first valve V1 and the condenser 53 may be provided with the second water pump 24.

The second water pump 24 may be operated when circulating the coolant in the first connection line 21 and the second connection line 31.

Here, the first valve V1 may connect the coolant line 11 and the first connection line 21 so that the coolant is supplied to the condenser 53 in the cooling mode and dehumidification mode of the vehicle.

In the present embodiment, the second connection line 31 may be selectively connected to the first connection line 21 through the second valve V2 so that the coolant of which the temperature is increased while passing through the electrical component 15 is circulated.

Also, the heater 30 is provided in the second connection line 31 to heat the interior of the vehicle by using the coolant of a high temperature.

The heater 30 may be provided inside the HVAC module 52 provided in the air conditioner device 50.

Here, the second valve V2 may connect the second connection line 31 to the first connection line 21 to supply the coolant of a high temperature passing through the electrical component 15 in the heating mode of the vehicle to the heater 30.

On the other hand, an air flap (not shown) may be provided in front of the radiator 12. The air flap is selectively closed according to the mode of the vehicle for the coolant to prevent the coolant from being cooled through heat-exchange with the outside air in the radiator 12.

Accordingly, the temperature of the coolant may be controlled while passing through the radiator 12 by the opening and closing operation of the air flap, and the waste heat of the electrical component 15 may be more efficiently recovered.

That is, when heating the vehicle indoor, the second valve V2 may connect the first connection line 21 and the second connection line 31 that are opened by the operation of the first valve V1 so that the coolant of which the temperature is increased while passing through the electrical component 15 is supplied to the heater 30.

Then, the coolant of high temperature passing through the electrical component 15 may be supplied to the heater 30.

That is, the heater 30 may heat the vehicle indoor as the coolant of high temperature passing through the electrical component 15 in the heating mode of the vehicle is supplied through the operation of the first and second water pumps 14 and 24.

Here, the first and second water pumps 14 and 24 may be electric-type water pumps.

In the present embodiment, the air conditioner device 50 includes an HVAC module (Heating, Ventilation, and Air Conditioning: 52), a condenser 53, a sub-condenser 54, an expansion valve 55, an evaporator 56, and a compressor 59 that are connected through the refrigerant line 51.

First, the HVAC module 52 may selectively inflow outside air into the vehicle's interior according to the cooling mode, heating mode, and dehumidification mode of the vehicle.

The condenser 53 is connected to the refrigerant line 51 to be connected to the first connection line 21 so that the refrigerant passes and the coolant passes.

This condenser 53 may condense the refrigerant through the coolant supplied through the first connection line 21 and heat-exchange. That is, the condenser 53 may be a water-cooled heat-exchanger inside which the coolant flows.

The condenser 53 configured in this way may condense the refrigerant by heat-exchanging the refrigerant supplied from the compressor 59 with the coolant selectively supplied from the cooling apparatus 10 through the first connection line 21.

The evaporator 56 is connected to the condenser 53 through the refrigerant line 51 and may evaporate the refrigerant.

Here, the evaporator 56 may be disposed in front of the heater 30 inside the HVAC module 52 based on the direction in which the outside air inflows to the interior of the vehicle so that the outside air inflowing to the HVAC module 52 passes first.

Accordingly, when the heating mode of the vehicle is operated, the coolant of high temperature may be supplied to the heater 30 along the first and second connection lines 21 and 31 by the operation control of the first and second valves V1 and V2.

Conversely, when the cooling mode of the vehicle is operated, the supply of the coolant to the heater 30 may be stopped by the operation control of the first and second valves V1 and V2, and the refrigerant may be supplied to the evaporator 56 by the operation of the air conditioner device 50.

Therefore, the thermal management system according to an embodiment of the present disclosure may omit a conventional opening/closing door that was applied to the HVAC module 52 to control the inflow of the outside air.

When the opening/closing door is omitted, the HVAC module 52 does not need to be provided in the indoor of the vehicle, so it is possible to secure the indoor space of the vehicle.

On the other hand, the sub-condenser 54 may be provided on the refrigerant line 51 between the condenser 53 and the evaporator 56.

The sub-condenser 54 may further condense the refrigerant condensed in the condenser 53 through heat-exchange with the outside air. That is, the sub-condenser 54 is disposed in front of the radiator 12 to mutually heat-exchange the refrigerant that flowed inside with the outside air.

That is, the sub-condenser 54 may be an air-cooled heat-exchanger that condenses the refrigerant using outside air.

In this way, the sub-condenser 54 may increase sub-cooling of the refrigerant by further condensing the refrigerant condensed in the condenser 53, and thereby improve a coefficient of performance (COP), which is a coefficient of cooling capacity compared to power required by the compressor.

In the present embodiment, the expansion valve 55 is provided on the refrigerant line 51 between the sub-condenser 54 and the evaporator 56. The expansion valve 55 receives the refrigerant that has passed through the sub-condenser 54 and expands it.

Also, the compressor 59 is connected through the refrigerant line 51 between the evaporator 56 and the condenser 53. This compressor 59 may compress the refrigerant in a gas state and supply the compressed refrigerant to the condenser 53.

Here, the expansion valve 55 may be an electronic expansion valve that selectively expands the refrigerant while controlling the flow of the refrigerant passing through the refrigerant line 51.

Further, the first and second valves V1 and V2 may be 4-way type valves.

The thermal management system for the vehicle according to another embodiment of the present disclosure is now described with reference to FIG. 2.

Figure 2:
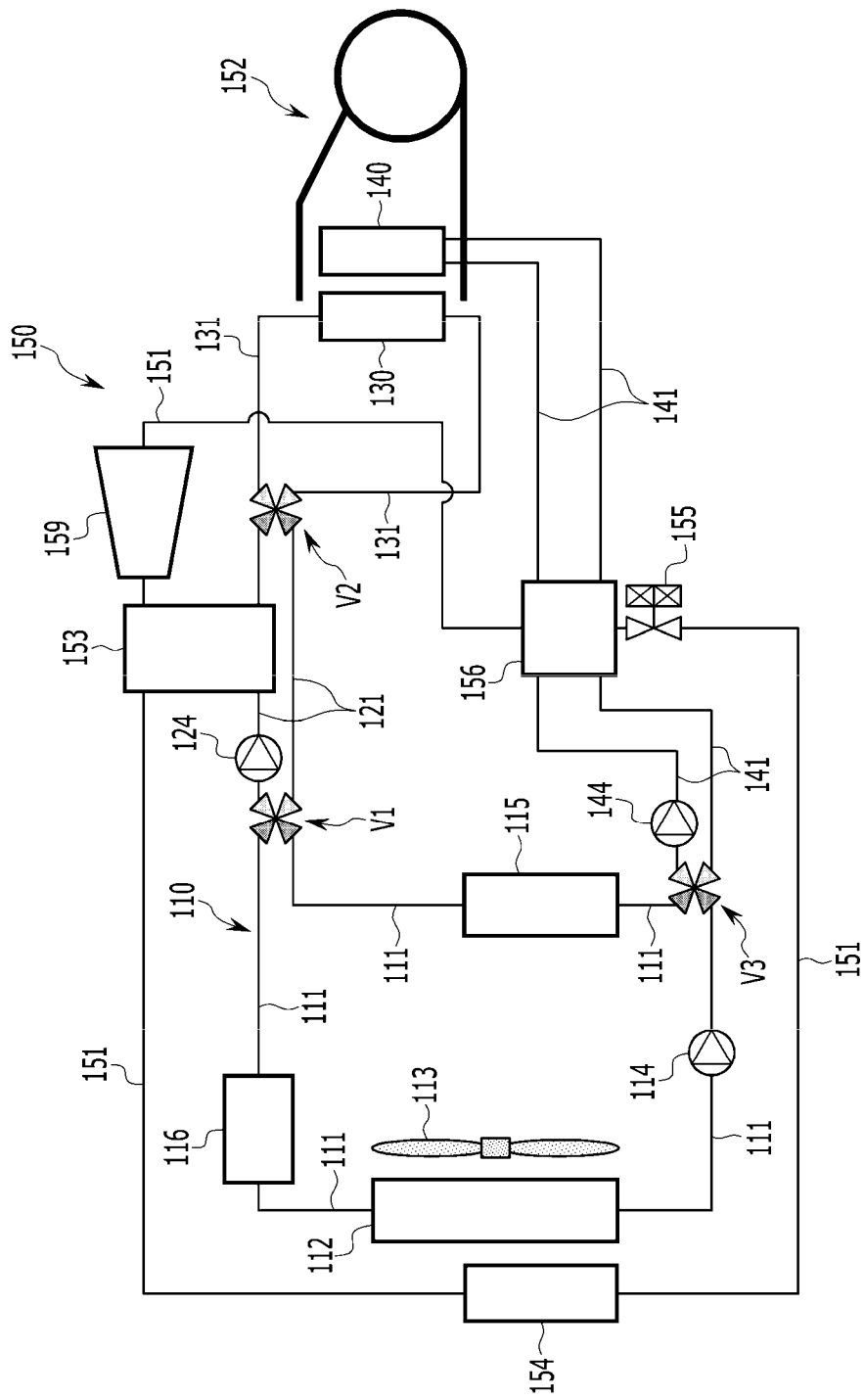
FIG. 2 is a block diagram of a thermal management system for a vehicle according to another embodiment of the present disclosure.

FIG. 2 is a block diagram of a thermal management system for a vehicle according to another embodiment of the present disclosure.

The thermal management system for the vehicle according to another embodiment of the present disclosure may recover the waste heat generated from the electrical component 115 to be used for the indoor heating, and perform the indoor cooling by using the coolant or the refrigerant.

The thermal management system may be applied to the electric vehicle.

Referring to FIG. 2, the thermal management system may include a cooling apparatus 110, a first connection line 121, a heater 130, a second connection line 131, and an air conditioner device 150.

First, the cooling apparatus 110 includes a radiator 112, a first water pump 114, a first valve V1, and a reservoir tank 116 that are connected by a coolant line 111.

The radiator 112 is disposed at the front of the vehicle, a cooling fan 113 is provided at the rear, and the coolant is cooled through the operation of the cooling fan 113 and heat-exchange with the outside air.

In addition, the electrical component 115 includes an electric power control unit (EPCU), a motor, an inverter, a power conversion device such as an on-board charger (OBC), or an autonomous driving controller.

The electric power control unit or the inverter may heat up while driving, and the on-board charger may heat up when charging the battery.

The electrical component 115 configured in this way is provided in the coolant line 111 and may be cooled as a water-cooling type.

Accordingly, in the heating mode of the vehicle when recovering the waste heat of the electrical component 115, heat generated from the electric power control unit, the motor, the inverter, or the on-board charger may be recovered.

On the other hand, the reservoir tank 116 is provided on the coolant line 111 between the radiator 112 and the first valve V1.

This cooling apparatus 110 may recirculate the coolant in the coolant line 111 through the operation of the first water pump 14 so that the coolant is supplied to the electrical component 115 provided on the coolant line 111.

The first connection line 121 is selectively connected to the coolant line 111 through the first valve V1.

Here, the first connection line 121 may be provided with the condenser 153 provided in the air conditioner device 150.

In addition, the first connection line 121 between the first valve V1 and the condenser 153 may be provided with the second water pump 124.

The second water pump 124 may be operated when the coolant is circulated in the first connection line 121 and the second connection line 131.

Here, the first valve V1 may connect the coolant line 111 and the first connection line 121 so that the coolant is supplied to the condenser 53 in the cooling mode and the dehumidification mode of the vehicle.

In the present embodiment, the second connection line 131 may be selectively connected through the first connection line 121 and the second valve V2 so that the coolant whose temperature has risen while passing through the electrical component 115 is selectively circulated.

The heater 130 is provided in the second connection line 131 to heat the interior of the vehicle by using high temperature coolant.

The heater 130 may be provided inside the HVAC module 152 provided in the air conditioner device 50.

Here, the second valve V2 may connect the second connection line 131 to the first connection line 121 to supply the coolant of a high temperature passing through the electrical component 115 to the heater 130 in the heating mode of the vehicle.

On the other hand, an air flap (not shown) may be provided in front of the radiator 112. The air flap is selectively closed according to the vehicle mode to prevent the coolant from being cooled through heat-exchange with the outside air in the radiator 112.

Accordingly, the temperature of the coolant may be controlled while passing through the radiator 112 by the opening and closing operation of the air flap, and the waste heat of the electrical component 115 may be recovered more efficiently.

That is, when heating the vehicle indoor, the second valve V2 may connect the first connection line 121 and the second connection line 131 that are opened by the operation of the first valve V1 so that the coolant of which the temperature is increased while passing through the electrical component 115 is supplied to the heater 130.

Then, the heater 130 may be supplied with the coolant of a high temperature passing through the electrical component 115.

That is, the heater 130 may heat the vehicle interior by supplying high temperature coolant that has passed through the electrical component 115 in the vehicle heating mode through the operation of the first and second water pumps 114 and 124.

Here, the first and second water pumps 114 and 124 may be electric water pumps.

In the present embodiment, the air conditioner device 150 includes a Heating, Ventilation, and Air Conditioning (HVAC) module 152, a condenser 153, a sub-condenser 154, an expansion valve 155, an evaporator 156, and a compressor 159 that are connected through the refrigerant line 151.

First, the HVAC module 152 may selectively inflow the outside air into the interior of the vehicle according to the cooling mode, heating mode, and dehumidification mode of the vehicle.

Here, a cooler 140 in which coolant of low temperature is selectively inflowed may be provided inside of the HVAC module 152.

The cooler 140 may be dispose in front of the heater 130 in the interior of the HVAC module 152 based on the direction in which the outside air inflows into the interior of the vehicle so that the outside air inflowed to the HVAC module 152 passes first.

The cooler 140 may be provided on the third connection line 141 selectively connected to the coolant line 111 through the operation of the third valve V3 provided on the coolant line 111 between the radiator 112 and the electrical component 115.

In the present embodiment, the condenser 153 is connected to the refrigerant line 151 to connect to the first connection line 121 so that the refrigerant passes and the coolant passes therethrough.

The condenser 153 may condense the refrigerant through the coolant supplied through the first connection line 121 and heat-exchange. That is, the condenser 153 may be a water-cooled heat-exchanger in which the coolant is inflowed.

The condenser 153 configured in this way may condense the refrigerant by heat-exchanging the refrigerant supplied from the compressor 159 with the coolant selectively supplied from the cooling apparatus 110 through the first connection line 121.

In the present embodiment, the evaporator 156 is connected to the condenser 153 through the refrigerant line 151 and may evaporate the refrigerant.

Here, the evaporator 156 is connected to the third connection line 141 so that coolant circulates inside, and the refrigerant supplied through the refrigerant line 151 may be evaporated through heat-exchange with the coolant.

The evaporator 156 may evaporate the refrigerant supplied from the condenser 153 and expanded in the expansion valve 155 through the coolant supplied through the third connection line 141 and heat-exchange. That is, the evaporator 156 may be a water-cooled heat-exchanger through which the coolant is inflowed.

The evaporator 156 configured in this way may evaporate the refrigerant by heat-exchanging the refrigerant expanded by the expansion valve 155 with the coolant selectively supplied from the cooling apparatus 110 through the third connection line 141.

On the other hand, the third connection line 141 between the third valve V3 and the evaporator 156 may be provided with a third water pump 144.

This third water pump 144 may be operated so that the coolant supplied from the cooling apparatus 110 in the cooling mode of the vehicle circulates along the third connection line 141 opened through the operation of the third valve V3.

Accordingly, the coolant whose temperature has been lowered through the refrigerant and heat-exchange while passing through the evaporator 156 in the cooling mode of the vehicle may be supplied to the cooler 140 through the third connection line 141.

Here, the third valve V3 may connect the coolant line 11 and the third connection line 141 so that the coolant cooled while passing through the evaporator 156 in the cooling mode of the vehicle is supplied to the cooler 140.

That is, the coolant whose temperature is lowered through the refrigerant and heat-exchange while passing through the evaporator 156 in the cooling mode of the vehicle may be supplied to the cooler 140 through the third connection line 141.

On the other hand, if the heating mode of the vehicle is operated, the coolant of high temperature may be supplied to the heater 130 along the first and second connection lines 121 and 131 by the operation control of the first and second valves V1 and V2.

Conversely, when the cooling mode of the vehicle is operated, the supply of the coolant to the heater 130 is stopped by the operation control of the first and second valves V1 and V2, and the refrigerant is supplied to the evaporator 156 by the operation of the air conditioner device 150.

In this state, the third connection line 141 is opened by the operation control of the third valve V3.

Then, the coolant supplied from the cooling apparatus 110 is heat-exchanged with the refrigerant in the evaporator 156 by the operation of the third water pump 144. Then, the coolant of which the temperature is lowered may be supplied to the cooler 140 along the third connection line 141.

Therefore, the thermal management system according to another embodiment of the present disclosure may omit the opening/closing door that was applied to the HVAC module 152 to control the inflow of the conventional outside air.

When the opening/closing door is omitted, the HVAC module 152 does not need to be provided in the vehicle, so it is possible to secure the indoor space of the vehicle.

On the other hand, the refrigerant line 151 between the condenser 153 and the evaporator 156 may be provided with the sub-condenser 154.

The sub-condenser 154 may further condense the refrigerant condensed in the condenser 153 through heat-exchange with the outside air. That is, the sub-condenser 154 is disposed in front of the radiator 112 to mutually heat-exchange the refrigerant inflowed to the outside air.

That is, the sub-condenser 154 may be an air-cooled heat-exchanger that condenses the refrigerant by using the outside air.

In this way, the sub-condenser 54 may increase sub-cooling of the refrigerant by further condensing the refrigerant condensed in the condenser 53, and thereby improve a coefficient of performance (COP), which is a coefficient of a cooling capacity compared to the power required by the compressor.

In the present embodiment, the expansion valve 155 is provided in the refrigerant line 151 between the sub-condenser 154 and the evaporator 156. The expansion valve 155 receives the refrigerant that has passed through the sub-condenser 154 and expands it.

Also, the compressor 159 is connected to between the evaporator 156 and the condenser 153 through the refrigerant line 151. This compressor 159 compresses the refrigerant in gas state and may supply the compressed refrigerant to the condenser 153.

Here, the expansion valve 155 may be an electronic expansion valve that selectively expands the refrigerant while controlling the flow of the refrigerant passing through the refrigerant line 151.

The first, second, and third valves V1, V2, and V3 may be 4-way valves.

As above-described, according to the thermal management system for the vehicle according to an embodiment of the present disclosure, by heating the vehicle indoor using the waste heat generated from the electrical components 15 and 115 and performing the indoor cooling of the vehicle using the refrigerant or coolant, simplification and ease of the entire system may be achieved.

In addition, the present disclosure may improve the heating efficiency by recovering the waste heat generated from the electrical components 15 and 115 to be used for the indoor heating.

In addition, the present disclosure may realize the HVAC module to be compact through the reduction of a number of parts of the HVAC module by omitting the opening/closing door provided inside the conventional HVAC module, thereby reducing the amount of manufacturing labor and improving productivity.

In addition, the present disclosure may secure sufficient indoor space of the vehicle by moving the HVAC modules 52 and 152, which were conventionally provided in the interior of the vehicle, from the car room to the vehicle body through the removal of the opening/closing door.

Furthermore, through the simplification of the entire system, it is possible to reduce a manufacturing cost and weight, and improve space utilization.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A thermal management system for a vehicle comprising:
   a coolant line for circulating a coolant, the coolant line fluidly connecting a radiator, a first water pump, and at least one electrical component, so as to cool the at least one electrical component;
   a first connection line having a first end and a second end and being connected at the first end to the coolant line through a first valve, the first connection line being provided with a condenser;
   a second connection line connected to the first connection line through a second valve at the second end of the first connection line; and
   a heater provided on the second connection line and inside an HVAC module of an air conditioner device,
   wherein the first valve is operable to connect the coolant line and the first connection line such that the coolant is supplied to the condenser in a cooling mode and in a dehumidification mode of the vehicle.

2. The thermal management system for the vehicle of claim 1, wherein the air conditioner device includes:
   the HVAC module that selectively inflows outside air into the interior of the vehicle according to a cooling mode, a heating mode, and a dehumidification mode of the vehicle;
   the condenser connected to the first connection line to recirculate the coolant inside and heat-exchanging the refrigerant supplied through the refrigerant line with the coolant;
   an evaporator connected to the condenser through the refrigerant line and evaporating the refrigerant;
   a compressor connected between the evaporator and the condenser through the refrigerant line; and
   an expansion valve provided on the refrigerant line between the condenser and the evaporator.

3. The thermal management system for the vehicle of claim 2, wherein
   the evaporator is disposed in front of the heater inside the HVAC module based on the direction in which the outside air inflows into the interior of the vehicle such that the outside air inflowing to the HVAC module passes first.

4. The thermal management system for the vehicle of claim 2, wherein
   a sub-condenser is further provided on the refrigerant line between the condenser and the evaporator.

5. The thermal management system for the vehicle of claim 4, wherein
   the condenser is a water-cooled heat-exchanger, and the sub-condenser and the evaporator each comprise an air-cooled heat-exchanger.

6. The thermal management system for the vehicle of claim 2, wherein
   inside the HVAC module, a cooler that selectively inflows low-temperature coolant is provided.

7. The thermal management system for the vehicle of claim 6, wherein
   the cooler is disposed in front of the heater inside the HVAC module based on the direction in which the outside air flows into the vehicle's interior so that the outside air inflowed into the HVAC module passes first.

8. The thermal management system for the vehicle of claim 6, wherein
   the cooler is provided on the third connection line, the third connection line being selectively connected to the coolant line through the operation of the third valve provided on the coolant line between the radiator and the electrical component.

9. The thermal management system for the vehicle of claim 8, wherein
   the evaporator is operably connected to the third connection line such that during operation, the coolant recirculates inside and evaporates the refrigerant supplied through the refrigerant line through heat-exchange with the coolant.

10. The thermal management system for the vehicle of claim 8, wherein
    a sub-condenser is further provided on the refrigerant line between the condenser and the evaporator,
    the condenser and the evaporator are a water-cooled heat-exchanger, and the sub-condenser is an air-cooled heat-exchanger.

11. The thermal management system for the vehicle of claim 8, wherein
    the temperature of the coolant lowered through heat-exchange with the refrigerant while passing through the evaporator is supplied through the third connection line to the cooler in the cooling mode of the vehicle.

12. The thermal management system for the vehicle of claim 8, wherein
    the third water pump is provided on the third connection line between the third valve and the evaporator.

13. The thermal management system for the vehicle of claim 8, wherein
    the third valve fluidly connects the coolant line and the third connection line, so as to supply the coolant passing the evaporator to the cooler, in the cooling mode of the vehicle.

14. The thermal management system for the vehicle of claim 8, wherein
    the third valve is a four-way valve.

15. The thermal management system for the vehicle of claim 2, wherein
    the second valve connects the second connection line to the first connection line to supply the coolant passing through the electrical component to the heater in the heating mode of the vehicle.

16. The thermal management system for the vehicle of claim 1, wherein
    a reservoir tank is provided on the coolant line between the radiator and the first valve.

17. The thermal management system for the vehicle of claim 1, wherein
    a second water pump is provided on the first connection line between the first valve and the condenser.

18. The thermal management system for the vehicle of claim 1, wherein
    each of the first and the second valves is a four-way valve.

19. The thermal management system for the vehicle of claim 1, wherein
    the electrical component is a component selected from the group consisting of a motor, an electric power control unit, an inverter, an on-board charger, a power converter, and an autonomous driving controller.

* * * * *